(12) United States Patent
Song et al.

(10) Patent No.: US 10,341,141 B2
(45) Date of Patent: Jul. 2, 2019

(54) FLOW ENTRY GENERATING METHOD AND APPARATUS

(71) Applicant: Huawei Technologies Co., Ltd., Shenzhen, Guangdong (CN)

(72) Inventors: Xuefei Song, Beijing (CN); Yinben Xia, Beijing (CN); Chao Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 187 days.

(21) Appl. No.: 15/242,243

(22) Filed: Aug. 19, 2016

(65) Prior Publication Data

US 2016/0359642 A1    Dec. 8, 2016

Related U.S. Application Data

(63) Continuation of application No. PCT/CN2014/094680, filed on Dec. 23, 2014.

(30) Foreign Application Priority Data

Feb. 21, 2014  (CN) .......................... 2014 1 0061200

(51) Int. Cl.
*H04L 12/64* (2006.01)
*H04L 12/715* (2013.01)
*H04L 12/721* (2013.01)

(52) U.S. Cl.
CPC .......... *H04L 12/6418* (2013.01); *H04L 45/64* (2013.01); *H04L 45/38* (2013.01); *H04L 45/62* (2013.01); *H04L 2012/6421* (2013.01)

(58) Field of Classification Search
CPC ................. H04L 12/6418; H04L 45/38; H04L 2012/6421; H04L 45/64; H04L 45/62
See application file for complete search history.

(56) References Cited

U.S. PATENT DOCUMENTS 9,883,507 B2 *   1/2018   Thubert ............... H04W 28/04
2013/0286822 A1 * 10/2013   Liu ......................... H04L 45/22
                                                    370/228
(Continued)

FOREIGN PATENT DOCUMENTS

CN         1981463 A       6/2007
CN       101321088 A      12/2008
(Continued)

OTHER PUBLICATIONS

Mallik Tatipamula et al., "Framework for PCE Based Multi-Layer Service Networks", IEICE Trans. Commun., vol. E90-B, No. 8, Aug. 2007, p. 1903-1911.

(Continued)

*Primary Examiner* — Ivan O Latorre

(57) ABSTRACT

This application discloses a flow entry generating method and apparatus. The method includes: receiving a service path establishment request, where the service path establishment request includes a constraint, a source device, and a target device; finding, in a data transmission network according to a cross-layer information model, a service path that meets the constraint and is from the source device to the target device, where the cross-layer information model is a model that describes, at a same layer, an overall topology relationship between an IP layer and an optical layer; and generating a respective corresponding flow entry for each forwarding device in the service path, and sending the flow entry to a corresponding forwarding device. This application can greatly reduce time complexity of computing the service path, and improve efficiency of computing the service path, thereby improving efficiency of generating a flow entry.

12 Claims, 6 Drawing Sheets

(56) References Cited

U.S. PATENT DOCUMENTS

| | | | | |
|---|---|---|---|---|
| 2013/0336116 A1* | 12/2013 | Vasseur | ............... | H04L 45/125 |
| | | | | 370/235 |
| 2014/0099119 A1* | 4/2014 | Wei | ............... | H04J 14/0257 |
| | | | | 398/79 |
| 2015/0003283 A1* | 1/2015 | Previdi | ............... | H04L 41/12 |
| | | | | 370/254 |
| 2015/0063802 A1* | 3/2015 | Bahadur | ............... | H04L 47/125 |
| | | | | 398/49 |
| 2016/0112327 A1* | 4/2016 | Morris | ............... | H04L 47/127 |
| | | | | 398/45 |

FOREIGN PATENT DOCUMENTS

| | | | |
|---|---|---|---|
| CN | 102143035 | A | 8/2011 |
| CN | 103051565 | A | 4/2013 |
| CN | 103200102 | A | 7/2013 |
| CN | 103338163 | A | 10/2013 |
| CN | 103812778 | A | 5/2014 |
| EP | 2487844 | A1 | 8/2012 |

OTHER PUBLICATIONS

Lei Liu et al., "Experimental demonstration of an OpenFlow/PCE integrated control plane for IP over translucent WSON with the assistance of a per-request-based dynamic topology server", Optics Express, vol. 21, No. 4, Feb. 25, 2013, p. 4183-4193.

Eiji Oki et al., "Dynamic Multilayer Routing Schemes in GMPLS-Based IP+Optical Networks", Next Generation Switching and Routing, IEEE Communications Magazine, vol. 43, No. 1, Jan. 1, 2005, p. 108-114.

Lei Liu et al., "From GMPLS to PCE/GMPLS to OpenFlow: How Much Benefit We Get from the Technical Evolution of Control Plane in Optical Networks?", 2012 14th International Conference on Transparent Optical Networks, Jul. 2, 2012, 4 pages.

The Open Network Foundation, "OpenFlow Switch Errata", Version 1.0.2, Nov. 1, 2013, 12 pages.

* cited by examiner

FLOW ENTRY GENERATING METHOD AND APPARATUS

CROSS-REFERENCE TO RELATED APPLICATIONS

This application is a continuation of International Application No. PCT/CN2014/094680, filed on Dec. 23, 2014, which claims priority to Chinese Patent Application No. 201410061200.8, filed on Feb. 21, 2014, both of which are hereby incorporated by reference in their entireties.

TECHNICAL FIELD

This application relates to the field of communications, and in particular, to a flow entry generating method and apparatus.

BACKGROUND

A software defined network (SDN) is a new network architecture. Compared with IP route searching used by a conventional network, an SDN/OpenFlow can implement flexible control on network traffic, provides a good platform for innovation of core networks and applications, and is a future development direction of network architectures.

An existing SDN network uses a dual-controller solution: an IP layer controller and an optical layer controller, where the IP layer controller is responsible for managing resources at an IP layer, and the optical layer controller is responsible for managing resources at an optical layer, that is, a layered management mode is implemented.

However, in an existing layered management mode, a process of acquiring a service path is very complex, and efficiency is very low. Referring to FIG. 1, FIG. 1 is a schematic structural diagram of an implementation manner of a layered model in a layered management mode in the prior art. As shown in FIG. 1, an IP layer controller (not shown in the figure) is responsible for managing routers 110, and an optical layer controller (not shown in the figure) is responsible for managing optical layer devices 120. The routers 110 include routers R1 to R6, and at least one virtual connection can be established between every two adjacent routers. For example, at the initial stage, a virtual connection that has been established between a router 110 and another router 110 is referred to as a virtual connection 1. A virtual connection 1 that has been established between the router R1 and the router R2 is referred to as a virtual connection 1 between the router R1 and the router R2; a virtual connection 1 that has been established between the router R2 and the router R3 is referred to as a virtual connection 1 between the router R2 and the router R3; a virtual connection 1 that has been established between the router R3 and the router R4 is referred to as a virtual connection 1 between the router R3 and the router R4; a virtual connection 1 that has been established between the router R4 and the router R5 is referred to as a virtual connection 1 between the router R4 and the router R5; a virtual connection 1 that has been established between the router R5 and the router R6 is referred to as a virtual connection 1 between the router R5 and the router R6; a virtual connection 1 that has been established between the router R6 and the router R1 is referred to as a virtual connection 1 between the router R6 and the router R1.

The optical layer devices 120 include optical layer devices O1 to O6, where an optical cross channel is established between the optical layer device O1 and the optical layer device O2; an optical cross channel is established between the optical layer device O2 and the optical layer device O3; an optical cross channel is established between the optical layer device O3 and the optical layer device O4; an optical cross channel is established between the optical layer device O4 and the optical layer device O5; an optical cross channel is established between the optical layer device O5 and the optical layer device O6; and an optical cross channel is established between the optical layer device O6 and the optical layer device O1. Each router 110 is connected to a corresponding optical layer device 120. It should be noted that, virtual connections instead of actual physical direct connections exist between the routers R1 to R6, and each virtual connection is corresponding to one optical cross channel at an optical layer. For example, the virtual connection 1 between the router R1 and the router R2 is corresponding to an optical cross channel established between O1 and O2, with a wavelength being λ1 and with a timeslot being 3.

The optical cross channel between the optical layer device O1 and the optical layer device O2 has a bandwidth of 20 G, where 10 G is allocated as a bandwidth of the virtual connection 1 between the router R1 and the router R2, so a remaining bandwidth of the optical cross channel between the optical layer device O1 and the optical layer device O2 is 20 G−10 G=10 G; a bandwidth of 5 G of the virtual connection 1 between the router R1 and the router R2 is already used, so a remaining bandwidth of the virtual connection 1 between the router R1 and the router R2 is 10 G−5 G=5 G. The optical cross channel between the optical layer device O2 and the optical layer device O3 has a bandwidth of 20 G, where 10 G is allocated as a bandwidth of the virtual connection 1 between the router R2 and the router R3, so a remaining bandwidth of the optical cross channel between the optical layer device O2 and the optical layer device O3 is 20 G−10 G=10 G; a bandwidth of 3 G of the virtual connection 1 between the router R2 and the router R3 is already used, so a remaining bandwidth of the virtual connection 1 between the router R2 and the router R3 is 10 G−3 G=7 G. The optical cross channel between the optical layer device O3 and the optical layer device O4 has a bandwidth of 20 G, where 20 G is allocated as a bandwidth of the virtual connection 1 between the router R3 and the router R4, so a remaining bandwidth of the optical cross channel between the optical layer device O3 and the optical layer device O4 is 20 G−20 G=0 G; a bandwidth of 5 G of the virtual connection 1 between the router R3 and the router R4 is already used, so a remaining bandwidth of the virtual connection 1 between the router R3 and the router R4 is 20 G−5 G=15 G. The optical cross channel between the optical layer device O4 and the optical layer device O5 has a bandwidth of 20 G, where 10 G is allocated as a bandwidth of the virtual connection 1 between the router R4 and the router R5, so a remaining bandwidth of the optical cross channel between the optical layer device O4 and the optical layer device O5 is 20 G−10 G=10 G; a bandwidth of 5 G of the virtual connection 1 between the router R4 and the router R5 is already used, so a remaining bandwidth of the virtual connection 1 between the router R4 and the router R5 is 10 G−5 G=5 G. The optical cross channel between the optical layer device O5 and the optical layer device O6 has a bandwidth of 20 G, where 20 G is allocated as a bandwidth of the virtual connection 1 between the router R5 and the router R6, so a remaining bandwidth of the optical cross channel between the optical layer device O5 and the optical layer device O6 is 20 G−20 G=0 G; a bandwidth of 5 G of the virtual connection 1 between the router R5 and the router R6 is already used, so a remaining bandwidth of the virtual connection 1 between the router R5 and the router R6 is 20 G−5 G=15 G. The optical cross channel between the optical layer device O6 and the optical layer device O1 has a bandwidth of 20 G, where 10 G is allocated as a bandwidth of the virtual connection 1 between the router R6 and the router R1, so a remaining bandwidth of the optical cross channel between the optical layer device O6 and the optical layer device O1 is 20 G−10 G=10 G; a bandwidth of 1 G of the virtual connection 1 between the router R6 and the router R1 is already used, so a remaining bandwidth of the virtual connection 1 between the router R6 and the router R1 is 10 G−1 G=9 G.

If the IP layer controller receives a request for establishing a service path, with a bandwidth of 6 G, from the router R1 to the router R4 (as shown by a dot dash line in the figure), the IP layer controller first computes a path at an IP layer, and attempts to establish a channel from the router R1 to the router R4 by using the existing virtual connections 1. The IP layer controller finds that the remaining bandwidth of the virtual connection 1 between the router R1 and the router R2 is only 5 G, which is less than 6 G that is required; therefore, an IP layer path: R1→R2→R3→R4 cannot be established for service flow transmission by using the existing virtual connections 1. In addition, the remaining bandwidth of the virtual connection 1 between the router R4 and the router R5 is also only 5 G, which is less than 6 G that is required, and an IP layer path R1→R6→R5→R4 cannot be established for service flow transmission by using the existing virtual connections 1 either.

In this case, the IP layer controller may attempt to establish a virtual connection R1→R4 with a bandwidth of 6 G, and the virtual connection is corresponding to an optical cross channel O1→O2→O3→O4 with a bandwidth of 6 G at the optical layer. However, because the layered management mode is used, the IP layer controller does not know the remaining bandwidth of an optical cross channel between the optical layer devices 120, and the optical layer controller does not know the remaining bandwidth of each virtual connection 1 between the routers 110 either. Therefore, the IP layer controller can only initiate, to the optical layer controller, a corresponding request for establishing a virtual connection, with a bandwidth of 6 G, from R1 to R4. After receiving the request, the optical layer controller attempts to establish, at the optical layer by using a remaining bandwidth of an optical cross channel between the optical layer devices 120, a new optical cross channel that is corresponding to the virtual connection from R1 to R4 at the IP layer, that is, O1→O2→O3→O4 (a corresponding complete path is R1→O1→O2→O3→O4→R4) or O1→O6→O5→O4 (a corresponding complete path is R1→O1→O6→O5→O4→R4). However, the optical layer controller finds that the remaining bandwidth of the optical cross channel between the optical layer device O3 and the optical layer device O4 is only 0 G, which is less than 6 G that is required, and the remaining bandwidth of the optical cross channel between the optical layer device O5 and the optical layer device O6 is also only 0 G, which is less than 6 G that is required. Therefore, the optical layer controller feeds back, to the IP layer controller, that the optical cross channel that is corresponding to the virtual connection, with a bandwidth of 6 G, from R1 to R4, cannot be established.

In this case, the IP layer controller may consider "making up" a channel from the router R1 to the router R4 by using the existing virtual connections 1 together with a new virtual connection that is established by requesting bandwidth from the optical layer controller. For example, the IP layer controller considers to use the existing virtual connection 1 between the router R1 and the router R6, and then, establish a new virtual connection between the router R6 and the router R4. However, although the virtual connection 1 between the router R1 and the router R6 has an enough bandwidth, when a new virtual connection is established between the router R6 and the router R4, the optical layer controller finds that the remaining bandwidth of the optical cross channel between the optical layer device O6 and the optical layer device O5 is only 0 G, which is less than 6 G that is required, and the optical layer controller cannot use a remaining bandwidth of an optical cross channel O6→O5→O4. In addition, the remaining bandwidth of the optical cross channel between the optical layer device O3 and the optical layer device O4 is also only 0 G, which is less than 6 G that is required, and the optical layer controller cannot use a remaining bandwidth of an optical cross channel O6→O1→O2→O3→O4 (a corresponding complete path is R6→O6→O1→O2>O3→O4→R4). Therefore, the optical layer controller feeds back, to the IP layer controller, that an optical cross channel that is corresponding to a virtual connection, with a bandwidth of 6 G, from R6 to R4, cannot be established, and using the existing virtual connection 1 between the router R1 and the router R6, and then establishing a new virtual connection between the router R6 and the router R4 cannot be implemented either.

A path that meets requirements may be found only after such a manner of trying each possible path is repeated multiple times, and moreover, in the entire process, the IP layer controller and the optical layer controller need to interact multiple times. For example, the path that meets requirements may be an IP layer transmission path with a bandwidth of 6 G that is formed by a new virtual connection 1 with a bandwidth of 6 G from the router R1 to the router R3 and the virtual connection 1 with the remaining bandwidth of 15 G from the router R3 to the router R4 (that is, establishing an IP layer transmission path from R1 to R4 by establishing a virtual connection 1 from R1 to R3 first, as shown by a single line in the figure, and then using the existing virtual connection 1 from R3 to R4), and an actual path of the entire channel is R1→O1→O2→O3→R3→O3→O4→R4.

If there are n routers 110 at the IP layer and m optical layer devices 120 at the optical layer, in such a layered management mode, time complexity is n*m. As a result, efficiency of service path computation is very low, further affecting efficiency of flow entry generation.

SUMMARY

This application provides a flow entry generating method and apparatus, which can improve efficiency of service path computation, thereby improving efficiency of flow entry generation.

A first aspect of this application provides a flow entry generating method, where the method includes the following steps: receiving a service path establishment request, where the service path establishment request includes a constraint, a source device, and a target device; finding, in a data transmission network according to a cross-layer information model, a service path that meets the constraint and is from the source device to the target device, where the cross-layer information model is a model that describes, at a same layer, an overall topology relationship between an IP layer and an optical layer; and separately generating a respective corresponding flow entry for each forwarding device in the service path, and separately sending the flow entry to a corresponding forwarding device.

With reference to the first aspect, in a first possible implementation manner of the first aspect of this application, the overall topology relationship between the IP layer and the optical layer includes: multiple nodes, a link between the multiple nodes, and an attribute of the link, where the multiple nodes include an IP layer port node and an access stratum node, and the multiple nodes further include at least one of an optical path layer node, a timeslot layer node, and a wavelength layer node, where the IP layer port node is a node abstracted from a port of an IP layer device in the data transmission network, the access stratum node is a node abstracted from a tributary side port of an optical layer device in the data transmission network, the optical path layer node is a node abstracted from an optical path layer of the optical layer device in the data transmission network, the timeslot layer node is a node abstracted from a timeslot layer of the optical layer device in the data transmission network, and the wavelength layer node is a node abstracted from a wavelength layer of the optical layer device in the data transmission network.

With reference to the first possible implementation manner of the first aspect, in a second possible implementation manner of the first aspect of this application, an attribute of a link between two timeslot layer nodes includes: a bandwidth, a delay, a weight, a shared risk link group identifier, and a timeslot; an attribute of a link between two wavelength layer node includes: a bandwidth, a delay, a weight, a shared risk link group identifier, a wavelength, and a timeslot; and an attribute of remaining links includes: a bandwidth, a delay, a weight, and a shared risk link group identifier.

With reference to the first possible implementation manner or the second possible implementation manner of the first aspect, in a third possible implementation manner of the first aspect of this application, before the step of finding, in a data transmission network according to a cross-layer information model, a service path that meets the constraint and is from the source device to the target device, the method further includes the following steps: acquiring the port of the IP layer device, the tributary side port of the optical layer device, the optical path layer of the optical layer device, the timeslot layer of the optical layer device, and the wavelength layer of the optical layer device, to respectively obtain through abstraction the IP layer port node, the access stratum node, the optical path layer node, the timeslot layer node, and the wavelength layer node; acquiring a connection relationship between the IP layer port node, the access stratum node, the optical path layer node, the timeslot layer node, and the wavelength layer node to determine a link between the IP layer port node, the access stratum node, the optical path layer node, the timeslot layer node, and the wavelength layer node; and acquiring an attribute of the link; and building the cross-layer information model according to the multiple nodes that are obtained through abstraction, the link, and the attribute of the link.

With reference to the second possible implementation manner of the first aspect, in a fourth possible implementation manner of the first aspect of this application, the method further includes: if nodes in the service path include an optical path layer node, updating a bandwidth of a link between optical path layer nodes in the service path in the cross-layer information model; or if nodes in the service path include a wavelength layer node, allocating, in the cross-layer information model, a wavelength to a link between wavelength layer nodes in the service path; or if nodes in the service path include a timeslot layer node, allocating, in the cross-layer information model, a timeslot to a link between timeslot layer nodes in the service path.

With reference to the first aspect, in a fifth possible implementation manner of the first aspect of this application, the constraint includes at least one of a bandwidth, a delay, IP layer first, optical layer first, and shared risk link group information.

With reference to the fifth possible implementation manner of the first aspect, in a sixth possible implementation manner of the first aspect of this application, the method further includes the following step: calculating a backup service path according to the shared risk link group information and the cross-layer information model.

A second aspect of this application provides a flow entry generating apparatus, including: a receiving module, a path finding module, and a flow entry module, where the receiving module is configured to receive a service path establishment request, where the service path establishment request includes a constraint, a source device, and a target device; and the receiving module sends the service path establishment request to the path finding module; the path finding module is configured to receive the service path establishment request, and find, in a data transmission network according to a cross-layer information model, a service path that meets the constraint and is from the source device to the target device, where the cross-layer information model is a model that describes, at a same layer, an overall topology relationship between an IP layer and an optical layer; and the path finding module sends the service path to the flow entry module; and the flow entry module is configured to receive the service path, separately generate a respective corresponding flow entry for each forwarding device in the service path, and separately send the flow entry to a corresponding forwarding device.

With reference to the second aspect, in a first possible implementation manner of the second aspect of this application, the overall topology relationship between the IP layer and the optical layer includes: multiple nodes, a link between the multiple nodes, and an attribute of the link, where the multiple nodes include an IP layer port node and an access stratum node, and the multiple nodes further include at least one of an optical path layer node, a times lot layer node, and a wavelength layer node, where the IP layer port node is a node abstracted from a port of an IP layer device in the data transmission network, the access stratum node is a node abstracted from a tributary side port of an optical layer device in the data transmission network, the optical path layer node is a node abstracted from an optical path layer of the optical layer device in the data transmission network, the timeslot layer node is a node abstracted from a timeslot layer of the optical layer device in the data transmission network, and the wavelength layer node is a node abstracted from a wavelength layer of the optical layer device in the data transmission network.

With reference to the second possible implementation manner of the second aspect, in a second possible implementation manner of the second aspect of this application, an attribute of a link between two timeslot layer nodes includes: a bandwidth, a delay, a weight, a shared risk link group identifier, and a timeslot; an attribute of a link between two wavelength layer node includes: a bandwidth, a delay, a weight, a shared risk link group identifier, a wavelength, and a timeslot; and an attribute of remaining links includes: a bandwidth, a delay, a weight, and a shared risk link group identifier.

With reference to the first possible implementation manner or the second possible implementation manner of the second aspect, in a third possible implementation manner of the second aspect of this application, the apparatus further includes: an acquiring module and a model building module, where the acquiring module is configured to acquire the port of the IP layer device, the tributary side port of the optical layer device, the optical path layer of the optical layer device, the timeslot layer of the optical layer device, and the wavelength layer of the optical layer device, to respectively obtain through abstraction the IP layer port node, the access stratum node, the optical path layer node, the timeslot layer node, and the wavelength layer node; acquire a connection relationship between the IP layer port node, the access stratum node, the optical path layer node, the timeslot layer node, and the wavelength layer node to determine a link between the IP layer port node, the access stratum node, the optical path layer node, the timeslot layer node, and the wavelength layer node; and acquire an attribute of the link; and the acquiring module sends the multiple nodes that are obtained through abstraction, the link, and the attribute of the link to the model building module; and the model building module is configured to receive the multiple nodes that are obtained through abstraction, the link, and the attribute of the link, and build the cross-layer information model according to the multiple nodes that are obtained through abstraction, the link, and the attribute of the link.

With reference to the second possible implementation manner of the second aspect, in a fourth possible implementation manner of the second aspect of this application, the apparatus further includes: an updating module, where the updating module is configured to: when nodes in the service path include an optical path layer node, update a bandwidth of a link between optical path layer nodes in the service path in the cross-layer information model; or when nodes in the service path include a wavelength layer node, allocate, in the cross-layer information model, a wavelength to a link between wavelength layer nodes in the service path; or when nodes in the service path include a timeslot layer node, allocate, in the cross-layer information model, a timeslot to a link between timeslot layer nodes in the service path.

With reference to the second aspect, in a fifth possible implementation manner of the second aspect of this application, the constraint includes at least one of a bandwidth, a delay, IP layer first, optical layer first, and shared risk link group information.

With reference to the fifth possible implementation manner of the second aspect, in a sixth possible implementation manner of the second aspect of this application, the path finding module is further configured to calculate a backup service path according to the shared risk link group information and the cross-layer information model.

In the foregoing solutions, according to a cross-layer information model in which an IP layer resource and an optical layer resource are located at a same layer, both the IP layer resource and the optical layer resource are considered during service path computation. Compared with a layered management mode originally used by an SDN network, in which an IP layer controller is responsible for managing IP layer resources and an optical layer controller is responsible for managing optical layer resources, time complexity of service path computation can be greatly reduced, and efficiency of service path computation is improved, thereby improving efficiency of flow entry generation.

DETAILED DESCRIPTION

In the following description, to illustrate rather than limit, specific details such as a particular system structure, an interface, and a technology are provided to make a thorough understanding of this application. However, a person skilled in the art should know that this application may be implemented in other implementation manners without these specific details. In other cases, detailed descriptions of well-known apparatuses, circuits, and methods are omitted, so that this application is described without being obscured by unnecessary details.

Figure 1:
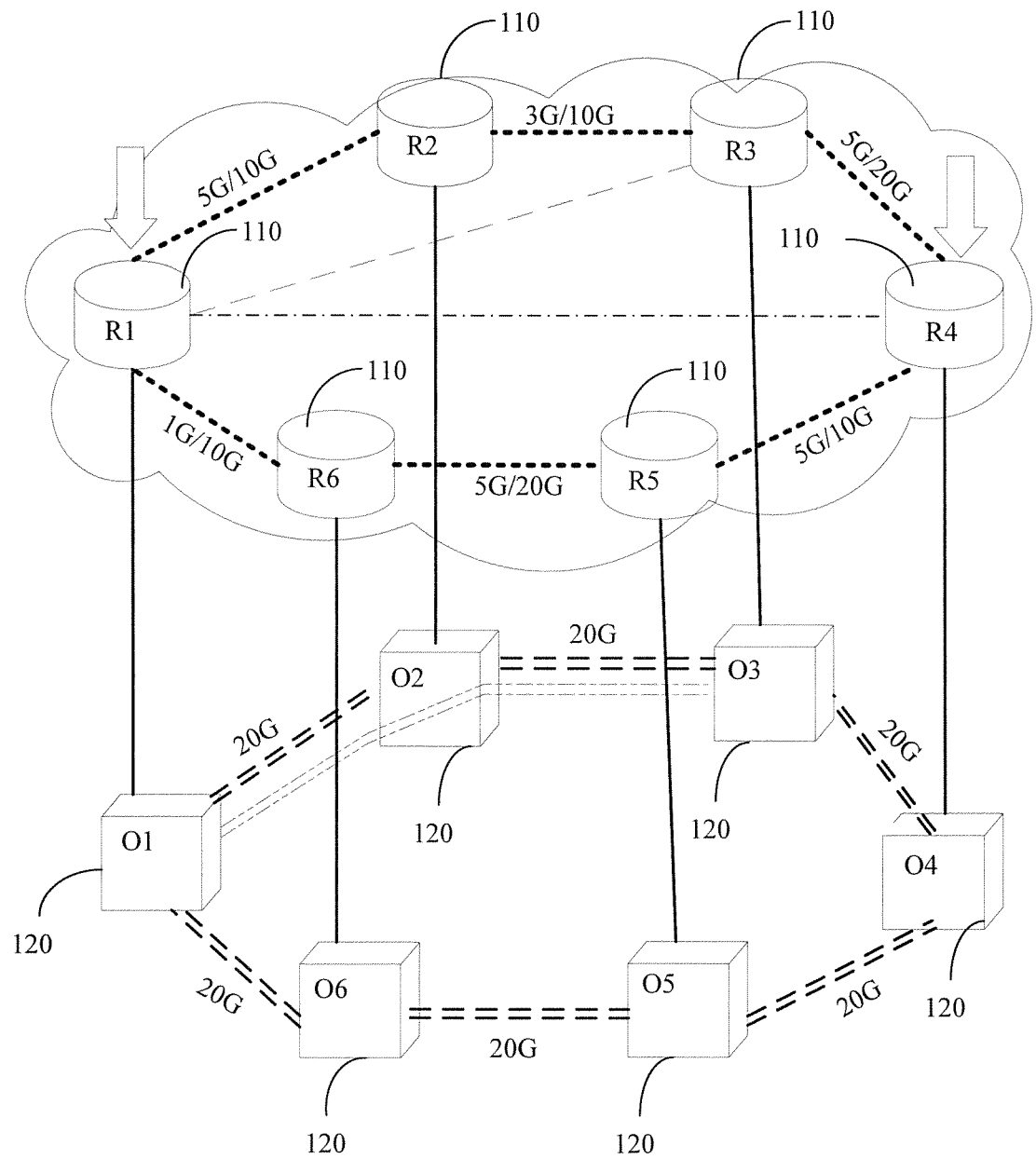
FIG. 1 is a schematic structural diagram of an implementation manner of a layered model in a layered management mode in the prior art.
Figure 2:
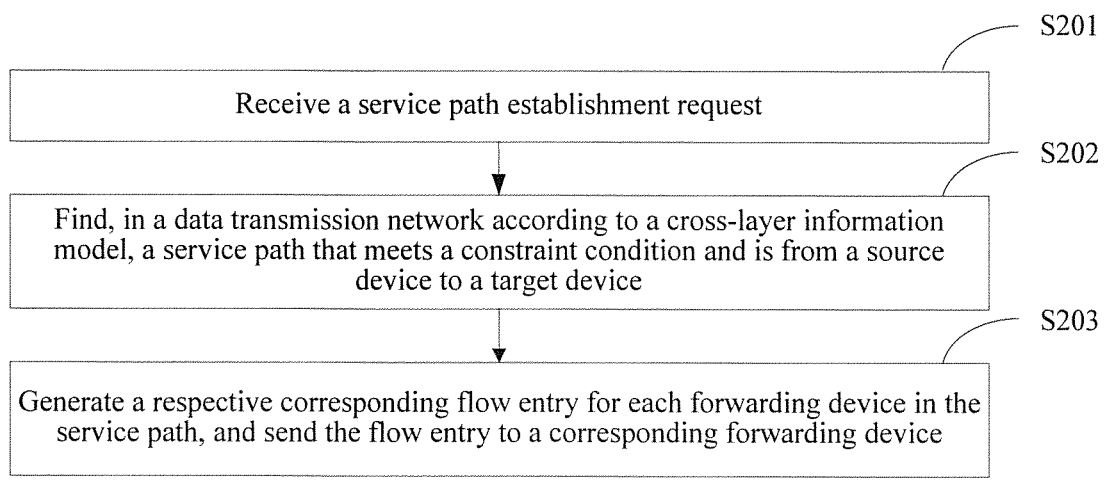
FIG. 2 is a flowchart of an implementation manner of a flow entry generating method according to this application.

Referring to FIG. 2, FIG. 2 is a flowchart of an implementation manner of a flow entry generating method according to this application. The flow entry generating method in this implementation manner includes the following steps:

S201: A controller receives a service path establishment request. The service path establishment request includes a constraint, a source device, and a target device.

When a service path needs to be established, the controller receives a service path establishment request that requests to establish, in a data transmission network, a path that meets a constraint and is from a source device to a target device. Therefore, the service path establishment request received by the controller must include the constraint, the source device, and the target device. The constraint includes at least one of a bandwidth, a delay, IP layer first, optical layer first, and shared risk link group information.

S202: The controller finds, in a data transmission network according to a cross-layer information model, a service path that meets a constraint and is from a source device to a target device.

The controller selects a port as a start node from the source device, selects a port as a target node from the target device, and finds, in the data transmission network according to the prebuilt cross-layer information model, a service path that meets the constraint and is from the start node to the target node. The cross-layer information model is a model that describes, at a same layer, an overall topology relationship between an IP layer and an optical layer.

S203: The controller generates a respective corresponding flow entry for each forwarding device in the service path, and sends the flow entry to a corresponding forwarding device.

After the service path is determined, devices, in the data transmission network, in the service path are also determined correspondingly, and a device in the service path is a forwarding device. The controller generates the respective corresponding flow entry for each forwarding device in the service path, and sends the flow entry to the corresponding forwarding device.

Further, after S203, when data transmission is performed, after the source device receives a packet of a service flow corresponding to the service path establishment request, the source device forwards the packet of the service flow to a next forwarding device in the service path according to the flow entry; after receiving the packet, the next forwarding device in the service path forwards the packet according to the flow entry; and after being forwarded multiple times, the packet is forwarded to the target device, and forwarding of the service flow is complete.

In the foregoing solutions, according to a cross-layer information model in which an IP layer resource and an optical layer resource are both located at a same layer, both the IP layer resource and the optical layer resource are considered during service path computation. Compared with a layered management mode originally used by an SDN network, in which an IP layer controller is responsible for managing the IP layer resource, and an optical layer controller is responsible for managing the optical layer resource, time complexity of computing the service path can be greatly reduced, and efficiency of computing the service path is improved, thereby improving efficiency of generating a flow entry.

Figure 3:
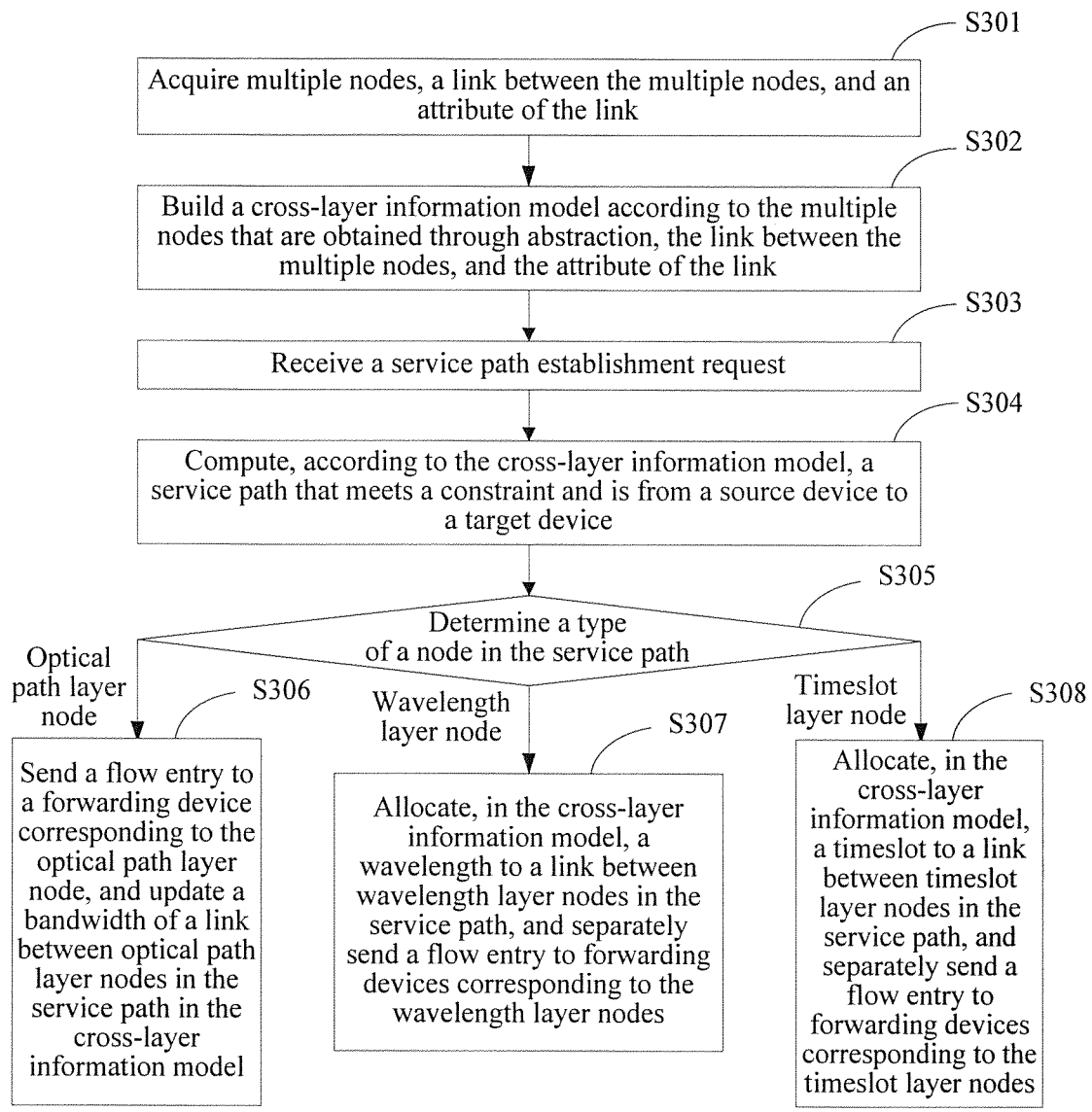
FIG. 3 is a flowchart of another implementation manner of a flow entry generating method according to this application.

Referring to FIG. 3, FIG. 3 is a flowchart of another implementation manner of a flow entry generating method according to this application. The flow entry generating method in this implementation manner includes the following steps:

S301: A controller acquires multiple nodes, a link between the multiple nodes, and an attribute of the link. The multiple nodes include an IP layer port node and an access stratum node, and the multiple nodes further include at least one of an optical path layer node, a timeslot layer node, and a wavelength layer node, where the IP layer port node is a node abstracted from a port of an IP layer device in the data transmission network, the access stratum node is a node abstracted from a tributary side port of an optical layer device in the data transmission network, the optical path layer node is a node abstracted from an optical path layer of the optical layer device in the data transmission network, the timeslot layer node is a node abstracted from a timeslot layer of the optical layer device in the data transmission network, and the wavelength layer node is a node abstracted from a wavelength layer of the optical layer device in the data transmission network.

Figure 4:
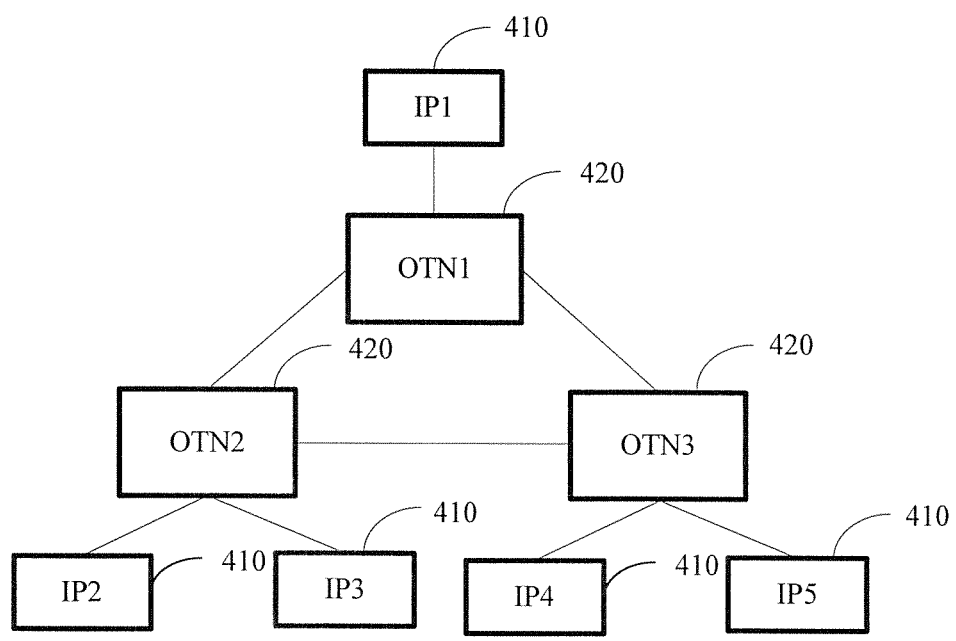
FIG. 4 is a topology diagram of an implementation manner of an IP layer device and an optical layer device in a flow entry generating method according to this application.
Figure 5:
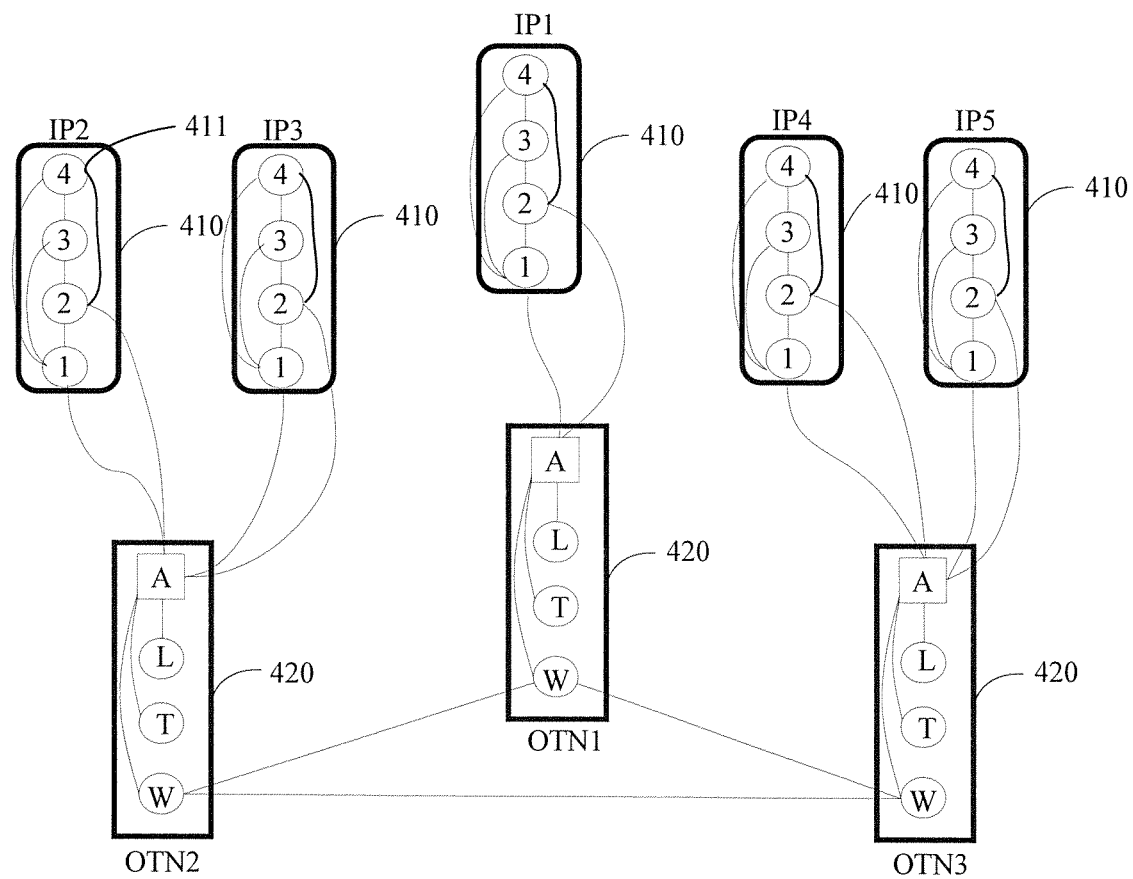
FIG. 5 is a topology diagram of a cross-layer information model obtained according to FIG. 4 in the flow entry generating method according to this application.

Referring also to FIG. 4 and FIG. 5, herein, a data transmission network is a network formed by multiple connected devices. In terms of device types, the devices are classified into IP layer devices 410 and optical layer devices 420.

The IP layer devices 410 include IP layer devices IP1 to IP5, and the optical layer devices 420 include optical layer devices OTN1 to OTN3. The IP layer device IP1 is connected to the optical layer device OTN1 by using a cable or an optical fiber; the optical layer device OTN1 is connected to the optical layer device OTN2 and the optical layer device OTN3 respectively by using an optical fiber; the optical layer device OTN2 is connected to the optical layer device OTN3 by using an optical fiber; the IP layer device IP2 and the IP layer device IP3 are both connected to the optical layer device OTN2 by using a cable or an optical fiber; the IP layer device IP4 and the IP layer device IP5 are both connected to the optical layer device OTN3 by using a cable or an optical fiber, forming a complete data transmission network physically.

For example, when a user terminal connected to the IP layer device IP1 needs to send data to a user terminal connected to the IP layer device IP2, the user terminal connected to the IP layer device IP1 first sends the data to the IP layer device IP1, the IP layer device IP1 sends the data to the optical layer device OTN1 by using a cable or an optical fiber, the optical layer device OTN1 sends the data to the optical layer device OTN2 by using an optical fiber, the optical layer device OTN2 sends the data to the IP layer device IP2 by using a cable or an optical fiber, and finally, the IP layer device IP2 sends the data to the user terminal connected to the IP layer device IP2.

In this embodiment of the present application, an IP layer device 410 may be a router, may be a switch, or may be another switching device, which is not limited in the present application. An optical layer device 420 may be an optical transport network (Optical Transport Network, OTN) device, may be a dense wavelength division multiplexing (Dense Wavelength Division Multiplexing, DWDM) device, or may be another transmission device, which is not limited in the present application.

The controller acquires, according to the data transmission network, the multiple nodes, the link between the multiple nodes, and the attribute of the link that are required for building a cross-layer information model, and a process thereof may be described by using an example as follows:

First, the controller acquires a port of each IP layer device 410, and abstracts each port into one IP layer port node 411. Therefore, if one IP layer device 410 has four ports, one IP layer device 410 may be abstracted into four IP layer port nodes 411. It is assumed that each IP layer device 410 in FIG. 4 has four ports, and then, 20 IP layer port nodes 411 may be obtained through abstraction. Then, the controller acquires bandwidths of ports of these IP layer devices 410.

Then, the controller acquires a port on a side (that is, a tributary side), connected to an IP layer device 410, of each optical layer device 420, and abstracts each port into one access stratum node A. The tributary side of each optical layer device 420 may have more than one port; therefore, each optical layer device 420 may be abstracted into more than one access stratum node A. The controller acquires bandwidths of ports on the tributary sides of these optical layer devices 420.

An optical layer device 420 generally has an optical path layer, a timeslot layer, and a wavelength layer. The optical layer device 420 may select any layer of the optical path layer, the timeslot layer, and the wavelength layer to perform transmission, that is, resources are transmitted in parallel at the optical path layer, the timeslot layer, and the wavelength layer. Therefore, the controller may acquire the optical path layer, the timeslot layer, and the wavelength layer to respectively obtain through abstraction an optical path layer node L, a timeslot layer node T, and a wavelength layer node W. The controller acquires bandwidths of the optical path layer, the timeslot layer, and the wavelength layer of the optical layer device 420.

Then, a connection relationship between ports of each IP layer device 410 may be preset, and generally, it is set that every two ports are connected. The controller may know in advance that a link exists between every two IP layer port nodes 411 in each IP layer device 410. Generally, bandwidths of ports of an IP layer device 410 are the same; therefore, a bandwidth of a link between an IP layer port node 411 and an IP layer port node 411 is equal to a bandwidth of a port of an IP layer device.

A connection relationship between an access stratum, an optical path layer, a timeslot layer, and a wavelength layer of each optical layer device 420 is also preset, and generally, it is set that the access stratum is separately connected to the optical path layer, the timeslot layer, and the wavelength layer. Therefore, the controller may know in advance that a link exists separately between an access stratum node A in each optical layer device 420 and an optical path layer node L, a timeslot layer node T, and a wavelength layer node W that are in the optical layer device 420. Bandwidths of the links separately between the access stratum node A in the optical layer device 420 and the optical layer node L, the timeslot layer node T and the wavelength layer node W that are in the optical layer device 420 are determined by a bandwidth of a tributary side port of the optical layer device 420.

Then, the controller may acquire a connection relationship between an IP layer device 410 and an optical layer device 420 and a connection relationship between optical layer devices 420 by using a link discovery protocol (if a connection relationship exists between IP layer devices 410, the connection relationship between the IP layer devices 410 further needs to be acquired), and further acquire a connection relationship between an IP layer port node 411, an access stratum node A, an optical path layer node L, a timeslot layer node T, and a wavelength layer node W to determine a link between every two of the IP layer port node 411, the access stratum node, the optical path layer node L, the timeslot layer node T, and the wavelength layer node W. The controller further acquires a delay of each link.

As shown in FIG. 4, the IP layer device IP1 is connected to the optical layer device OTN1; the IP layer device IP2 and the IP layer device IP3 are connected to the optical layer device OTN2; and the IP layer device IP4 and the IP layer device IP5 are connected to the optical layer device OTN3. It is assumed that each IP layer device 410 is connected, by using a port 1 and a port 2, to a port on a side, connected to the IP layer device 410, of the optical layer device 420, and then, a link exists between an IP layer port node 1 of each IP layer device 410 and an access stratum node A of a corresponding optical layer device 420 and a link exists between an IP layer port node 2 of each IP layer device 410 and the access stratum node A of the corresponding optical layer device 420. A bandwidth of a link between the IP layer port node 411 and the access stratum node A is determined by a smaller one of a bandwidth of a port of an IP layer device and a bandwidth of a tributary side port of an optical layer device 420.

In this implementation manner, a connection relationship exists between the optical layer device OTN1 and the optical layer device OTN2; and it is assumed that transmission is performed between the optical layer device OTN1 and the optical layer device OTN2 by using a wavelength layer, and then, a link exists between a wavelength layer node W of the optical layer device OTN1 and a wavelength layer node W of the optical layer device OTN2. A connection relationship exists between the optical layer device OTN2 and the optical layer device OTN3; and it is assumed that transmission is performed between the optical layer device OTN2 and the optical layer device OTN3 by using a wavelength layer, and then, a link exists between the wavelength layer node W of the optical layer device OTN2 and a wavelength layer node W of the optical layer device OTN3. A connection relationship exists between the optical layer device OTN3 and the optical layer device OTN1; and it is assumed that transmission is performed between the optical layer device OTN3 and the optical layer device OTN1 by using a wavelength layer, and then, a link exists between the wavelength layer node W of the optical layer device OTN3 and the wavelength layer node W of the optical layer device OTN1. In addition to acquiring a bandwidth of a link between two wavelength layer nodes W, the controller further needs to acquire a timeslot and a wavelength of the link between the two wavelength layer nodes W. In this implementation manner, no link exists between timeslot layer nodes T of two different optical layer devices 420; however, in another networking scenario, a link may exist between two timeslot layer nodes T, or a link may exist between two timeslot layer nodes T. When a link exists between two timeslot layer nodes T, in addition to acquiring a bandwidth of the link between the two timeslot layer nodes T, the controller further needs to acquire a timeslot of the link between the two timeslot layer nodes T.

The controller further set a shared risk link group identifier for each link. When the shared risk link group identifier is set, a same shared risk link group identifier is set for links on a same optical fiber, and different shared risk link group identifiers are set for links on different optical fibers.

S302: The controller builds a cross-layer information model according to the multiple nodes that are obtained through abstraction, the link between the multiple nodes, and the attribute of the link.

The controller may build a cross-layer information model shown in FIG. 5 according to the multiple nodes that are obtained through abstraction, the link between the multiple nodes, and the attribute of the link, and all nodes and links in the cross-layer information model are located at a same layer. For simplicity and convenience, a description is made by using a unilateral diagram in FIG. 5, and in fact, the cross-layer information model may be further described by using a bidirectional diagram.

S303: The controller receives a service path establishment request. The service path establishment request includes a constraint, a source device, and a target device.

When a service path needs to be established, the controller receives a service path establishment request that requests to establish, in a data transmission network, a path that meets a constraint and is from a source device to a target device. Therefore, the service path establishment request received by the controller must include the constraint, the source device, and the target device. The constraint is a condition that the established service path must meet and includes at least one of a bandwidth, a delay, IP layer first, optical layer first, and shared risk link group information.

If the constraint includes the IP layer first and/or the optical layer first, the controller may further set a weight for a link according to the constraint. For example, if the constraint includes the IP layer first, a weight of a link between IP layer port nodes 411 of two IP layer devices 410 is set to be relatively small, and a weight of a link between optical path layer nodes L of two optical layer devices 420, a weight of a link between wavelength layer nodes W of two optical layer devices 420, and a weight of a link between timeslot layer nodes T of two optical layer devices 420 are set to be relatively large. If the constraint includes the optical layer first, a weight of a link between optical path layer nodes L of two optical layer devices 420, a weight of a link between wavelength layer nodes W of two optical layer devices 420, and a weight of a link between timeslot layer nodes T of two optical layer devices 420 are set to be relatively small, and a weight of a link between IP layer port nodes 411 of two IP layer devices 410 is set to be relatively large. If the constraint includes both the IP layer first and the optical layer first, a weight of a link between IP layer port nodes 411 of two IP layer devices 410, a weight of a link between optical path layer nodes L of two optical layer devices 420, a weight of a link between wavelength layer nodes W of two optical layer devices 420, and a weight of a link between timeslot layer nodes T of two optical layer devices 420 are all set to be the same.

S304: The controller finds, in a data transmission network according to the cross-layer information model, a service path that meets a constraint and is from a source device to a target device.

The controller selects a port as a start node from the source device, selects a port as a target node from the target device, and calculates, by using a shortest path algorithm according to the prebuilt cross-layer information model, a service path that meets the constraint and is from the start node to the target node. After the service path is determined, devices, in the data transmission network, in the service path are also determined correspondingly, and a device in the service path is a forwarding device. The controller separately generates a respective corresponding flow entry for each forwarding device in the service path. In another implementation manner, an algorithm such as a linear programming algorithm may also be used when the service path is calculated, which is not specifically limited in the present application.

S305: The controller determines whether nodes in the service path include an optical path layer node, a wavelength layer node, and a timeslot layer node.

As described above, for a service flow, an optical layer device 420 may select any layer of an optical path layer, a timeslot layer, and a wavelength layer to perform transmission. When the optical layer device 420 uses different layers to perform transmission, the controller needs to perform different processing; therefore, the controller needs to determine whether types of the nodes in the service path include an optical path layer node L, a timeslot layer node T, and a wavelength layer node W. If the types of the nodes include an optical path layer node L, step S306 is performed; if the types of the nodes include a wavelength layer node W, step S307 is performed; and if the types of the nodes include a timeslot layer node T, step S308 is performed. In the embodiment shown in FIG. 5, the types of the nodes in the service path include only a wavelength layer node W, and therefore, corresponding to the embodiment shown in FIG. 5, S307 is performed.

S306: The controller separately sends a flow entry to a forwarding device corresponding to the optical path layer node, and updates a bandwidth of a link between optical path layer nodes in the service path in the cross-layer information model.

If the nodes in the service path include an optical path layer node L, it indicates that an optical layer device 420 corresponding to an optical path layer node L performs transmission by using an optical path layer, and therefore, the controller separately sends the flow entry to a forwarding device corresponding to the optical path layer node L, and then, updates a bandwidth of a link between optical path layer nodes in the service path in the cross-layer information model.

S307: The controller allocates, in the cross-layer information model, a wavelength to a link between wavelength layer nodes in the service path, and separately sends the flow entry to forwarding devices corresponding to the wavelength layer nodes.

If the nodes in the service path include a wavelength layer node W, it indicates that an optical layer device 420 corresponding to a wavelength layer node W performs transmission by using a wavelength layer, and therefore, the controller allocates, in the cross-layer information model, a wavelength to a link between wavelength layer nodes in the service path, and separately sends the flow entry to forwarding devices corresponding to the wavelength layer nodes W.

S308: The controller allocates, in the cross-layer information model, a timeslot to a link between timeslot layer nodes in the service path, and separately sends the flow entry to forwarding devices corresponding to the timeslot layer nodes.

If the nodes in the service path include a timeslot layer node T, it indicates that an optical layer device 420 corresponding to a timeslot layer node T performs transmission by using a timeslot layer, and therefore, the controller allocates, in the cross-layer information model, a timeslot to a link between timeslot layer nodes in the service path, and separately sends the flow entry to forwarding devices corresponding to the timeslot layer nodes T.

When data transmission is performed, after the source device receives a packet of a service flow corresponding to the service path establishment request, the source device forwards the packet of the service flow to a next forwarding device in the service path according to the flow entry; and after receiving the packet, the next forwarding device in the service path forwards the packet according to the flow entry; and after the packet is forwarded multiple times, the packet is forwarded to the target device, so that the service flow is forwarded.

It may be understood that, when the constraint includes the shared risk link group information, a backup service path may be further calculated according to shared risk link group information of each link by using the cross-layer information model. The shared risk link group information includes information about shared risk link group identifiers that are already used by links on the original service path. When the backup service path is calculated, a link that has a same shared risk link group identifier as a link on the original service path is not used, so that a shared risk link group identifier of a link on the backup service path is different from a shared risk link group identifier in the original service path. Because links having different shared risk link group identifiers are not located on a same optical fiber, a probability that a fault occurs at the same time is relatively low, so that a probability that a fault occurs in the backup service path that is calculated according to the shared risk link group information and the original service path at the same is greatly reduced.

When this implementation manner is used, a cross-layer information model is built, and all devices are placed at a same layer; therefore, if an IP layer has n IP layer devices 410, and an optical layer has m optical layer devices 420, there are n+m devices at the same layer; therefore, when the cross-layer information model is used to calculate a service path, time complexity is n+m, efficiency with the time complexity of n+m is higher than efficiency with time complexity of n*m when a layered management mode is used, and when values of n and m are lager, an effect is more obvious, thereby improving efficiency of generating a flow entry.

Figure 6:
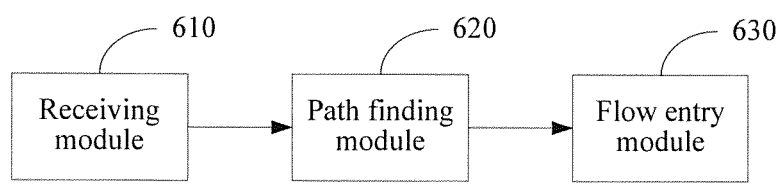
FIG. 6 is a schematic structural diagram of an implementation manner of a flow entry generating apparatus according to this application.

Referring to FIG. 6, FIG. 6 is a schematic structural diagram of an implementation manner of a flow entry generating apparatus according to this application. The flow entry generating apparatus in this implementation manner includes: a receiving module 610, a path finding module 620, and a flow entry module 630.

The receiving module 610 is configured to receive a service path establishment request, where the service path establishment request includes a constraint, a source device, and a target device; and the receiving module 610 sends the service path establishment request to the path finding module 620.

The path finding module 620 is configured to receive the service path establishment request, and find, in a data transmission network according to a cross-layer information model, a service path that meets the constraint and is from the source device to the target device, where the cross-layer information model is a model that describes, at a same layer, an overall topology relationship between an IP layer and an optical layer; and the path finding module 620 sends the service path to the flow entry module 630.

The flow entry module 630 is configured to receive the service path, separately generate a respective corresponding flow entry for each forwarding device in the service path, and separately send the flow entry to a corresponding forwarding device.

Optionally, the overall topology relationship between the IP layer and the optical layer includes: multiple nodes, a link between the multiple nodes, and an attribute of the link, where the multiple nodes include an IP layer port node and an access stratum node, and the multiple nodes further include at least one of an optical path layer node, a timeslot layer node, and a wavelength layer node, where the IP layer port node is a node abstracted from a port of an IP layer device in the data transmission network, the access stratum node is a node abstracted from a tributary side port of an optical layer device in the data transmission network, the optical path layer node is a node abstracted from an optical path layer of the optical layer device in the data transmission network, the timeslot layer node is a node abstracted from a timeslot layer of the optical layer device in the data transmission network, and the wavelength layer node is a node abstracted from a wavelength layer of the optical layer device in the data transmission network.

Optionally, an attribute of a link between two timeslot layer nodes includes: a bandwidth, a delay, a weight, a shared risk link group identifier, and a timeslot; an attribute of a link between two wavelength layer node includes: a bandwidth, a delay, a weight, a shared risk link group identifier, a wavelength, and a timeslot; and an attribute of remaining links includes: a bandwidth, a delay, a weight, and a shared risk link group identifier.

Optionally, the constraint includes at least one of a bandwidth, a delay, IP layer first, optical layer first, and shared risk link group information.

Optionally, the path finding module 620 is further configured to calculate a backup service path according to the shared risk link group information and the cross-layer information model.

Figure 7:
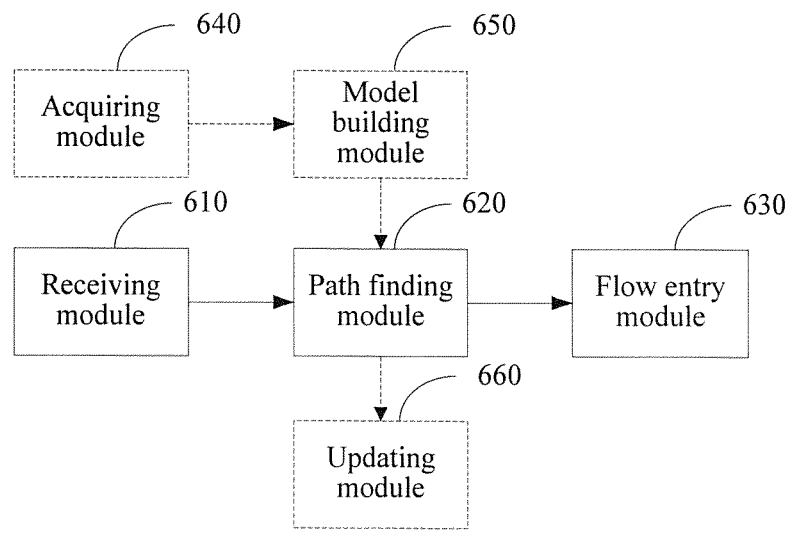
FIG. 7 is a schematic structural diagram of another implementation manner of a flow entry generating apparatus according to this application.

The flow entry generating apparatus shown in FIG. 6 may be further extended to a flow entry generating apparatus shown in FIG. 7.

Optionally, the apparatus further includes: an acquiring module 640 and a model building module 650, where the acquiring module 640 is configured to acquire the port of the IP layer device, the tributary side port of the optical layer device, the optical path layer of the optical layer device, the timeslot layer of the optical layer device, and the wavelength layer of the optical layer device, to respectively obtain through abstraction the IP layer port node, the access stratum node, the optical path layer node, the timeslot layer node, and the wavelength layer node; acquire a connection relationship between the IP layer port node, the access stratum node, the optical path layer node, the timeslot layer node, and the wavelength layer node to determine a link between the IP layer port node, the access stratum node, the optical path layer node, the timeslot layer node, and the wavelength layer node; and acquire an attribute of the link; and the acquiring module 640 sends the multiple nodes that are obtained through abstraction, the link, and the attribute of the link to the model building module 650; and the model building module 650 is configured to receive the multiple nodes that are obtained through abstraction, the link, and the attribute of the link, and build the cross-layer information model according to the multiple nodes that are obtained through abstraction, the link, and the attribute of the link.

Optionally, the apparatus further includes: an updating module 660, where the updating module 660 is configured to: when nodes in the service path include an optical path layer node, update a bandwidth of a link between optical path layer nodes in the service path in the cross-layer information model; or when nodes in the service path include a wavelength layer node, allocate, in the cross-layer information model, a wavelength to a link between wavelength layer nodes in the service path; or when nodes in the service path include a timeslot layer node, allocate, in the cross-layer information model, a timeslot to a link between timeslot layer nodes in the service path.

It may be understood that, the apparatus shown in FIG. 6 may perform the steps in the embodiment corresponding to FIG. 2, and the apparatus shown in FIG. 7 may perform the steps in the embodiment corresponding to FIG. 3.

Figure 8:
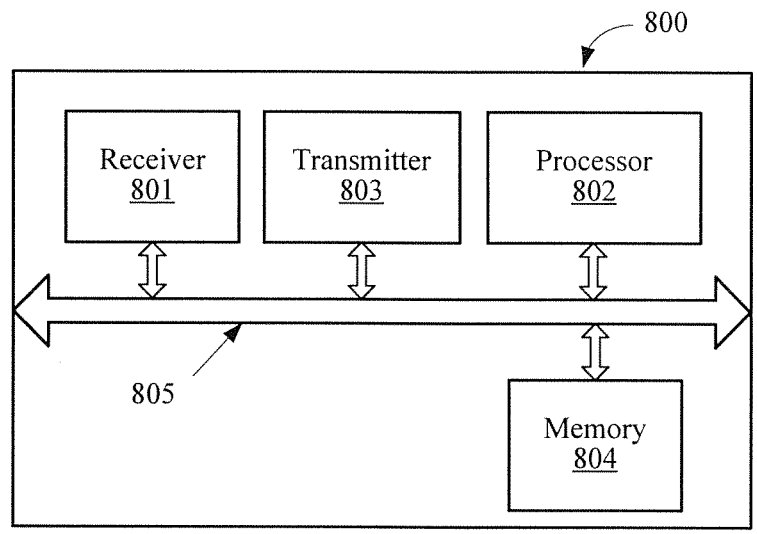
FIG. 8 is a schematic structural diagram of an implementation manner of a controller according to this application.

Referring to FIG. 8, FIG. 8 is a schematic structural diagram of an implementation manner of a controller according to this application. The controller 800 in this implementation manner may include: a receiver 801, a processor 802, a transmitter 803, and a memory 804.

The memory 804 may include a read-only memory and a random access memory, and provides an instruction and data to the processor 802. A part of the memory 804 may further include a non-volatile random access memory (NVRAM).

The memory 804 stores the following elements, executable modules or data structures, or a subset thereof, or an extension set thereof:

operation instructions: including various operation instructions, used to implement various operations; and an operating system: including various system programs, configured to implement various fundamental services and process a hardware-based task.

In this embodiment of the present application, the processor 802 performs the following operations by invoking an operation instruction (the operation instruction may be stored in an operating system) stored in the memory 804:

receiving a service path establishment request by using the receiver 801, where the service path establishment request includes a constraint, a source device, and a target device; finding, in a data transmission network according to a cross-layer information model, a service path that meets the constraint and is from the source device to the target device, where the cross-layer information model is a model that describes, at a same layer, an overall topology relationship between an IP layer and an optical layer; and separately generating a respective corresponding flow entry for each forwarding device in the service path, and separately sending the flow entry to a corresponding forwarding device by using the transmitter 803.

In this embodiment of the present application, according to a cross-layer information model in which a IP layer resource and a optical layer resource are both located at a same layer, a controller 800 considers the IP layer resource and the optical layer resource at the same time when calculating a service path, so that compared with a layered management mode originally used by an SDN network, in which an IP layer controller is responsible for managing the IP layer resource, and an optical layer controller is responsible for managing the optical layer resource, time complexity of calculating the service path can be greatly reduced, and efficiency of calculating the service path is improved, thereby improving efficiency of generating a flow entry.

The processor 802 controls an operation of the controller 800, and the processor 802 may be further referred to as a CPU (Central Processing Unit, central processing unit). The memory 804 may include a read-only memory and a random access memory, and provides an instruction and data to the processor 802. A part of the memory 804 may further include a non-volatile random access memory (NVRAM). In a specific application, components of the controller 800 are coupled together by using a bus system 805, and besides including a data bus, the bus system 805 further includes a power bus, a control bus, and a state signal bus. However, for clear description, various buses are marked as the bus system 805 in the figure.

The methods disclosed in the embodiments of the present application may be applied to the processor 802 or implemented by the processor 802. The processor 802 may be an integrated circuit chip, and has a signal processing capability. In an implementation process, the steps of the foregoing methods can be completed by using an integrated logical circuit of hardware or an instruction in a software form in the processor 802. The processor 802 may be a general processor, a digital signal processor (DSP), an application specific integrated circuit (ASIC), a field programmable gate array (FPGA), another programmable logical device, a discrete gate, a transistor logical device, or a discrete hardware component. The methods, steps, and logical block diagrams disclosed in the embodiments of the present application may be implemented or performed. The general processor may be a microprocessor, or the processor may be any conventional processor. With reference to the methods disclosed in the embodiments of the present application, steps may be represented directly as being implemented by a hardware decoding processor, or implemented by a combination of hardware and software modules in a decoding processor. The software module may be located in a storage medium mature in the art, such as a random access memory, a flash memory, a read-only memory, a programmable read-only memory, an electrically erasable programmable memory, or a register. The storage medium is located in the memory 804, and the processor 802 reads information in the memory 804 and completes the steps of the foregoing methods in combination with hardware thereof.

Optionally, the overall topology relationship between the IP layer and the optical layer includes: multiple nodes, a link between the multiple nodes, and an attribute of the link, where the multiple nodes include an IP layer port node and an access stratum node, and the multiple nodes further include at least one of an optical path layer node, a timeslot layer node, and a wavelength layer node, where the IP layer port node is a node abstracted from a port of an IP layer device in the data transmission network, the access stratum node is a node abstracted from a tributary side port of an optical layer device in the data transmission network, the optical path layer node is a node abstracted from an optical path layer of the optical layer device in the data transmission network, the timeslot layer node is a node abstracted from a timeslot layer of the optical layer device in the data transmission network, and the wavelength layer node is a node abstracted from a wavelength layer of the optical layer device in the data transmission network.

Optionally, an attribute of a link between two timeslot layer nodes includes: a bandwidth, a delay, a weight, a shared risk link group identifier, and a timeslot; an attribute of a link between two wavelength layer node includes: a bandwidth, a delay, a weight, a shared risk link group identifier, a wavelength, and a timeslot; and an attribute of remaining links includes: a bandwidth, a delay, a weight, and a shared risk link group identifier.

Optionally, the processor 802 acquires the port of the IP layer device, the tributary side port of the optical layer device, the optical path layer of the optical layer device, the timeslot layer of the optical layer device, and the wavelength layer of the optical layer device, to respectively obtain through abstraction the IP layer port node, the access stratum node, the optical path layer node, the timeslot layer node, and the wavelength layer node; acquires a connection relationship between the IP layer port node, the access stratum node, the optical path layer node, the timeslot layer node, and the wavelength layer node to determine a link between the IP layer port node, the access stratum node, the optical path layer node, the timeslot layer node, and the wavelength layer node; and acquires an attribute of the link; and builds the cross-layer information model according to the multiple nodes that are obtained through abstraction, the link, and the attribute of the link.

Optionally, when nodes in the service path include an optical path layer node, the processor 802 updates a bandwidth of a link between optical path layer nodes in the service path in the cross-layer information model; or when nodes in the service path include a wavelength layer node, the processor 802 allocates, in the cross-layer information model, a wavelength to a link between wavelength layer nodes in the service path; or when nodes in the service path include a timeslot layer node, the processor 802 allocates, in the cross-layer information model, a timeslot to a link between timeslot layer nodes in the service path.

Optionally, the constraint includes at least one of a bandwidth, a delay, IP layer first, optical layer first, and shared risk link group information.

Optionally, the processor 802 calculates a backup service path according to the shared risk link group information and the cross-layer information model.

In the several implementation manners provided by this application, it should be understood that the disclosed system, apparatus, and method may be implemented in other manners. For example, the described apparatus embodiment is merely exemplary. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the implementation manners.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. A flow entry generating method, comprising:
   receiving a service path establishment request comprising: a constraint, a source device, and a target device;
   finding, in a data transmission network according to a cross-layer information model, a service path that meets the constraint and is from the source device to the target device, wherein the cross-layer information model describes a topology relationship between an IP layer and an optical layer, wherein the topology relationship between the IP layer and the optical layer comprises:
      multiple nodes, a link between the multiple nodes, and an attribute of the link, wherein the multiple nodes comprise an IP layer port node and an access stratum node, and the multiple nodes further comprise at least one of an optical path layer node, a timeslot layer node, and a wavelength layer node, wherein the IP layer port node is a node abstracted from a port of an IP layer device in the data transmission network, the access stratum node is a node abstracted from a tributary side port of an optical layer device in the data transmission network, the optical path layer node is a node abstracted from an optical path layer of the optical layer device in the data transmission network, the timeslot layer node is a node abstracted from a timeslot layer of the optical layer device in the data transmission network, and the wavelength layer node is a node abstracted from a wavelength layer of the optical layer device in the data transmission network; and
   generating a respective corresponding flow entry for each forwarding device in the service path according to the cross-layer information model, and sending the flow entry to a corresponding forwarding device.

2. The method according to claim 1, wherein:
   an attribute of a link between two timeslot layer nodes comprises: a bandwidth, a delay, a weight, a shared risk link group identifier, and a timeslot;
   an attribute of a link between two wavelength layer node comprises: a bandwidth, a delay, a weight, a shared risk link group identifier, a wavelength, and a timeslot; and
   an attribute of remaining links comprises: a bandwidth, a delay, a weight, and a shared risk link group identifier.

3. The method according to claim 1, wherein before finding, in a data transmission network according to a cross-layer information model, a service path that meets the constraint and is from the source device to the target device, the method further comprises:
   acquiring the port of the IP layer device, the tributary side port of the optical layer device, the optical path layer of the optical layer device, the timeslot layer of the optical layer device, and the wavelength layer of the optical layer device, to respectively obtain, through abstraction, the IP layer port node, the access stratum node, the optical path layer node, the timeslot layer node, and the wavelength layer node;
   acquiring a connection relationship between the IP layer port node, the access stratum node, the optical path layer node, the timeslot layer node, and the wavelength layer node to determine a link between every two of the IP layer port node, the access stratum node, the optical path layer node, the timeslot layer node, and the wavelength layer node;
   acquiring an attribute of the link; and
   building the cross-layer information model according to the multiple nodes that are obtained through abstraction, the link, and the attribute of the link.

4. The method according to claim 2, further comprising:
   if nodes in the service path comprise an optical path layer node, updating a bandwidth of a link between optical path layer nodes in the service path in the cross-layer information model; or
   if nodes in the service path comprise a wavelength layer node, allocating, in the cross-layer information model, a wavelength to a link between wavelength layer nodes in the service path; or
   if nodes in the service path comprise a timeslot layer node, allocating, in the cross-layer information model, a timeslot to a link between timeslot layer nodes in the service path.

5. The method according to claim 1, wherein the constraint comprises at least one of a bandwidth, a delay, IP layer first, optical layer first, and shared risk link group information.

6. The method according to claim 5, further comprising:
   obtaining, through computation, a backup service path according to the shared risk link group information and the cross-layer information model.

7. A flow entry generating apparatus, comprising:
   a memory; and
   a processor in communication with the memory, wherein the processor is configured to:
      receive a service path establishment request comprising: a constraint, a source device, and a target device,
      find, in a data transmission network according to a cross-layer information model, a service path that meets the constraint and is from the source device to the target device, wherein the cross-layer information model describes a topology relationship between an IP layer and an optical layer, wherein the topology relationship between the IP layer and the optical layer comprises:
         multiple nodes, a link between the multiple nodes, and an attribute of the link, wherein the multiple nodes comprise an IP layer port node and an access stratum node, and the multiple nodes further comprise at least one of an optical path layer node, a timeslot layer node, and a wavelength layer node, wherein the IP layer port node is a node abstracted from a port of an IP layer device in the data transmission network, the access stratum node is a node abstracted from a tributary side port of an optical layer device in the data transmission network, the optical path layer node is a node abstracted from an optical path layer of the optical layer device in the data transmission network, the timeslot layer node is a node abstracted from a timeslot layer of the optical layer device in the data transmission network, and the wavelength layer node is a node abstracted from a wavelength layer of the optical layer device in the data transmission network, generate a respective corresponding flow entry for each forwarding device in the service path according to the cross-layer information model, and send the flow entry to a corresponding forwarding device.

8. The flow entry generating apparatus according to claim 7, wherein:

an attribute of a link between two timeslot layer nodes comprises: a bandwidth, a delay, a weight, a shared risk link group identifier, and a timeslot;

an attribute of a link between two wavelength layer node comprises: a bandwidth, a delay, a weight, a shared risk link group identifier, a wavelength, and a timeslot; and an attribute of remaining links comprises: a bandwidth, a delay, a weight, and a shared risk link group identifier.

9. The flow entry generating apparatus according to claim 7, wherein the processor is further configured to:

acquire the port of the IP layer device, the tributary side port of the optical layer device, the optical path layer of the optical layer device, the timeslot layer of the optical layer device, and the wavelength layer of the optical layer device, to respectively obtain, through abstraction, the IP layer port node, the access stratum node, the optical path layer node, the timeslot layer node, and the wavelength layer node, acquire a connection relationship between the IP layer port node, the access stratum node, the optical path layer node, the timeslot layer node, and the wavelength layer node to determine a link between the IP layer port node, the access stratum node, the optical path layer node, the timeslot layer node, and the wavelength layer node; and acquire an attribute of the link, and build the cross-layer information model according to the multiple nodes that are obtained through abstraction, the link, and the attribute of the link.

10. The flow entry generating apparatus according to claim 8, wherein the processor is further configured to:

when nodes in the service path comprise an optical path layer node, update a bandwidth of a link between optical path layer nodes in the service path in the cross-layer information model; or when nodes in the service path comprise a wavelength layer node, allocate, in the cross-layer information model, a wavelength to a link between wavelength layer nodes in the service path; or when nodes in the service path comprise a timeslot layer node, allocate, in the cross-layer information model, a timeslot to a link between timeslot layer nodes in the service path.

11. The flow entry generating apparatus according to claim 7, wherein the constraint comprises at least one of a bandwidth, a delay, IP layer first, optical layer first, and shared risk link group information.

12. The flow entry generating apparatus according to claim 11, wherein the processor is further configured to obtain, through computation, a backup service path according to the shared risk link group information and the cross-layer information model.

* * * * *